(12) United States Patent
Kim et al.

(10) Patent No.: US 11,351,895 B2
(45) Date of Patent: Jun. 7, 2022

(54) VEHICLE SEAT

(71) Applicant: NHK SPRING CO., LTD., Yokohama (JP)

(72) Inventors: Donghyoun Kim, Yokohama (JP); Katsutoshi Imanari, Yokohama (JP)

(73) Assignee: NHK SPRING CO., LTD, Yokohama (JP)

( * ) Notice: Subject to any disclaimer, the term of this patent is extended or adjusted under 35 U.S.C. 154(b) by 0 days.

(21) Appl. No.: 17/090,227

(22) Filed: Nov. 5, 2020

(65) Prior Publication Data

US 2021/0138942 A1   May 13, 2021

(30) Foreign Application Priority Data

Nov. 11, 2019   (JP) .............................. JP2019-204262

(51) Int. Cl.
  *B60N 2/56*   (2006.01)
  *B60H 1/00*   (2006.01)

(52) U.S. Cl.
  CPC ....... *B60N 2/5657* (2013.01); *B60H 1/00285* (2013.01); *B60N 2/5635* (2013.01); *B60N 2/5678* (2013.01); *B60H 2001/003* (2013.01)

(58) Field of Classification Search
  CPC .. B60N 2/5657; B60N 2/5635; B60N 2/5678; B60H 1/00285; B60H 2001/003
  USPC .................................................. 297/180.14
  See application file for complete search history.

(56) References Cited

U.S. PATENT DOCUMENTS

| | | | |
|---|---|---|---|
| 2006/0060344 A1* | 3/2006 | Esaki ................. | B60H 1/00285 165/287 |
| 2007/0095378 A1* | 5/2007 | Ito ........................ | B60N 2/5657 136/203 |
| 2015/0165950 A1* | 6/2015 | Sachs ...................... | A47C 7/18 297/452.48 |
| 2015/0329028 A1* | 11/2015 | Ogino .................. | B60N 2/5685 297/180.14 |
| 2017/0144574 A1* | 5/2017 | Tanaka ................. | H05B 1/0227 |
| 2019/0047449 A1* | 2/2019 | Fujii .................... | B60N 2/5657 |
| 2019/0241043 A1* | 8/2019 | Ito .......................... | B60N 2/002 |
| 2020/0001755 A1* | 1/2020 | Zhang .................. | B60N 2/5657 |
| 2021/0039471 A1* | 2/2021 | Nakashima .......... | B60H 1/0073 |
| 2021/0039530 A1* | 2/2021 | Wilson ................. | B60N 2/5657 |
| 2021/0039791 A1* | 2/2021 | Wilson ................. | B60N 2/5657 |

FOREIGN PATENT DOCUMENTS

JP     A 2018-193057     12/2018

* cited by examiner

*Primary Examiner* — Mark R Wendell
(74) *Attorney, Agent, or Firm* — Dority & Manning, P.A.

(57) ABSTRACT

A vehicle seat including: a seat cushion configured to support buttocks and thighs of a seated occupant; a temperature changing section that is provided at the seat cushion and is switchable between a first state in which the temperature changing section operates so as to warm the seated occupant from a front end portion of the seat cushion, and a second state in which the temperature changing section does not operate so as to warm the seated occupant from the front end portion of the seat cushion and a control section configured to control the temperature changing section so as to alternate repeatedly between the first state and the second state in a state in which an occupant is sitting on the seat cushion.

8 Claims, 9 Drawing Sheets

FIG.9
SWELLING MEASUREMENT RESULTS

VEHICLE SEAT

CROSS-REFERENCE TO RELATED APPLICATION

This application is based on and claims priority under 35 USC 119 from Japanese Patent Application No. 2019-204262 filed on Nov. 11, 2019, the disclosure of which is incorporated by reference herein.

BACKGROUND

Technical Field

The present disclosure relates to a vehicle seat.

Related Art

Technology is known that attempts to relieve fatigue in a seated occupant by warming and cooling the seated occupant at a seat up-down direction intermediate portion of a seatback and at a seat front-rear direction intermediate portion of a seat cushion (see, for example, Japanese Patent Application Laid-Open (JP-A) No. 2018-193057).

However, in this related art, regions of the seated occupant that are warmed and cooled are within regions supported by the seat, and correspond to locations comparatively close to the heart and distant from any veins (in other words locations where veins are found far below the skin). This related art cannot necessarily be expected to be effective in improving the blood circulation of the seated occupant, and leaves room for improvement from the perspective of suppressing swelling of the legs of the seated occupant.

SUMMARY

In consideration of the above circumstances, an object of the present disclosure is to obtain a vehicle seat capable of suppressing swelling of the legs of a seated occupant.

A vehicle seat according to a first aspect of the present disclosure includes a seat cushion configured to support buttocks and thighs of a seated occupant; a temperature changing section that is provided at the seat cushion and is switchable between a first state in which the temperature changing section operates so as to warm the seated occupant from a front end portion of the seat cushion, and a second state in which the temperature changing section does not operate so as to warm the seated occupant from the front end portion of the seat cushion; and a control section configured to control the temperature changing section so as to alternate repeatedly between the first state and the second state in a state in which an occupant is sitting on the seat cushion.

According to the above configuration, the seat cushion supports the buttocks and thighs of the seated occupant. The temperature changing section provided to the seat cushion is capable of switching between the first state in which the temperature changing section operates so as to warm the seated occupant from the front end portion of the seat cushion, and the second state in which the temperature changing section does not operate so as to warm the seated occupant from the front end portion of the seat cushion. The control section controls the temperature changing section so as to alternate repeatedly between the first state and the second state in a state in which an occupant is sitting on the seat cushion. Accordingly, at least a region corresponding to the back of the knees of the seated occupant and the vicinity thereof, namely a region comparatively distant from the heart and close to veins (in other words a region where veins are close to the skin) is warmed intermittently, thus effectively improving the blood circulation of the seated occupant.

A vehicle seat of a second aspect of the present disclosure is the first aspect, wherein the temperature changing section includes an air blower mechanism configured to supply warm air toward at least a seat front upper side through the front end portion of the seat cushion when in the first state, and configured to supply cool air toward at least the seat front upper side through the front end portion of the seat cushion when in the second state.

According to the above configuration, the air blower mechanism serving as the temperature changing section supplies warm air toward at least the seat front upper side through the front end portion of the seat cushion when in the first state, and supplies cool air toward at least the seat front upper side through the front end portion of the seat cushion when in the second state. At least a region corresponding to the back of the knees of the seated occupant and the vicinity thereof is thus warmed and cooled, thereby even more effectively improving the blood circulation of the seated occupant.

A vehicle seat of a third aspect of the present disclosure is the second aspect, further including a physical build information acquisition section configured to acquire information relating to a physical build of an occupant sitting on the seat cushion, The control section is configured to control the air blower mechanism based on the information acquired by the physical build information acquisition section, such that a rate at which air is supplied by the air blower mechanism is directly proportional to a size of the physical build of the occupant.

According to the above configuration, the physical build information acquisition section acquires the information relating to the physical build of the occupant sitting on the seat cushion. The control section controls the air blower mechanism based on the information acquired by the physical build information acquisition section so as to increase the rate at which air is supplied by the air blower mechanism the larger the physical build of the seated occupant. Accordingly, at least a region corresponding to the back of the knees of the seated occupant and the vicinity to the lower side thereof can be effectively warmed and cooled even in a case the seated occupant has a large physical build and there is therefore a greater distance from the front end portion of the seat cushion to the back of the knees of the seated occupant and the vicinity to the lower side thereof.

A vehicle seat of a fourth aspect of the present disclosure is the first aspect, wherein the temperature changing section includes a planar heater disposed in the front end portion of the seat cushion, the planar heater being powered to generate heat when in the first state, and being placed in an unpowered state when in the second state.

According to the above configuration, the planar heater serving as the temperature changing section is disposed in the front end portion of the seat cushion and is powered to generate heat when in the first state and placed in the unpowered state when in the second state. Accordingly, at least a region corresponding to the back of the knees of the seated occupant and the vicinity thereof is warmed intermittently by a simple configuration, thus effectively improving the blood circulation of the seated occupant.

As described above, the vehicle seat of the present disclosure exhibits the excellent advantageous effect of enabling swelling of the legs of the seated occupant to be suppressed.

BRIEF DESCRIPTION OF THE DRAWINGS

Exemplary embodiments of the present disclosure will be described in detail based on the following figures, wherein.

DETAILED DESCRIPTION

First Exemplary Embodiment

Explanation follows regarding a vehicle seat according to a first exemplary embodiment of the present disclosure, with reference to FIG. 1 to FIG. 5. In the drawings, the arrow FR indicates a seat front side, the arrow UP indicates a seat upper side, and the arrow W indicates a seat width direction, as appropriate.

Figure 1:
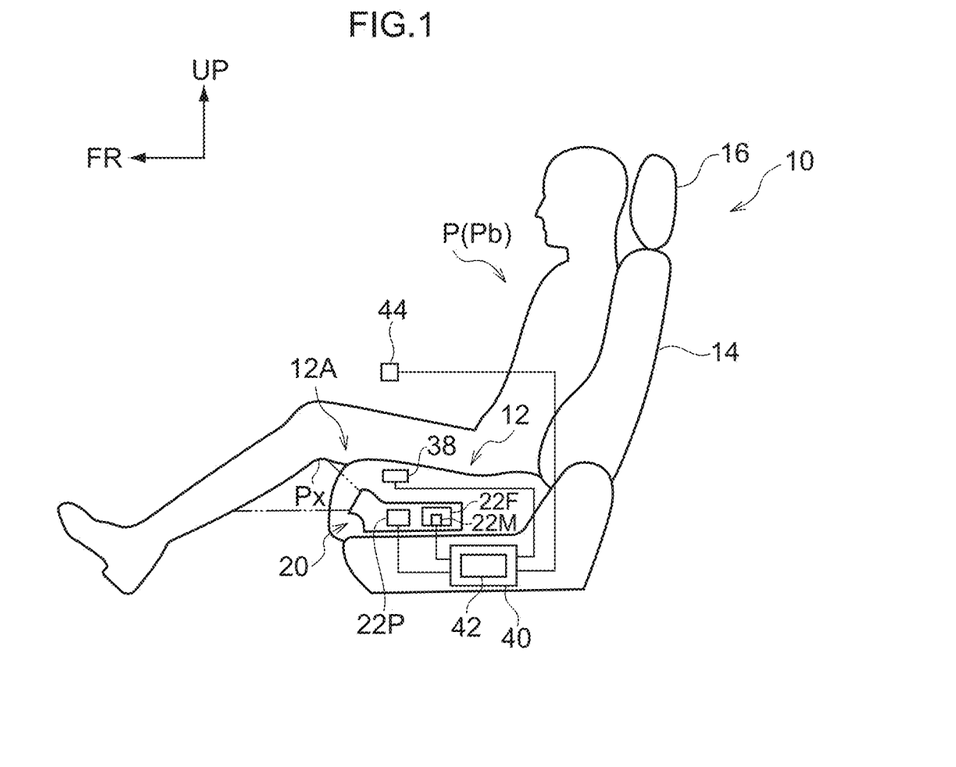
FIG. 1 is a schematic side view illustrating a vehicle seat according to a first exemplary embodiment of the present disclosure.

FIG. 1 is a schematic side view illustrating a vehicle seat 10 according to the present exemplary embodiment. As illustrated in FIG. 1, the vehicle seat 10 includes a seat cushion 12 to support the buttocks and thighs of a seated occupant P, a seatback 14 to support the back of the seated occupant P, and a headrest 16 to support the head of the seated occupant P. The seat cushion 12 is configured by covering a seat cushion frame (not illustrated in the drawings) with a cushion pad 30 (see FIG. 2), and covering a surface of the cushion pad 30 with an outer cover. An air blower mechanism 20 (illustrated schematically in the drawings) is provided inside the seat cushion 12 as a temperature changing section.

Figure 2:
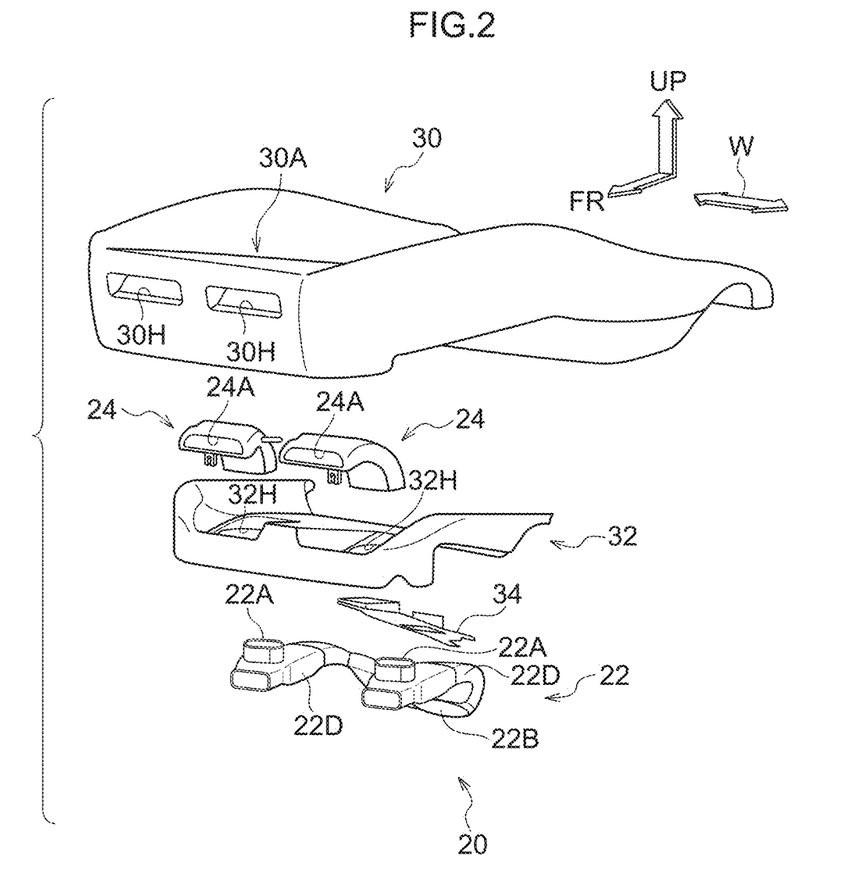
FIG. 2 is an exploded perspective view corresponding to a portion of FIG. 1 illustrating an air blower mechanism and its surroundings.

FIG. 2 is a simplified exploded perspective view illustrating the air blower mechanism 20 and its surroundings. As illustrated in FIG. 2, the air blower mechanism 20 includes an air-conditioning unit 22. The air-conditioning unit 22 includes left and right ducts 22D. The left and right ducts 22D include respective air outlet openings 22A. The air outlet openings 22A are disposed facing toward the seat upper side. A blower device 22B is connected to the ducts 22D. The blower device 22B is provided at a seat width direction intermediate portion of the air-conditioning unit 22. Actuating an internal blower fan 22F (schematically illustrated in FIG. 1) of the blower device 22B causes air that has been taken in through a specific inlet inside the vehicle cabin to pass through the ducts 22D and be expelled toward the seat front upper side through the respective air outlet openings 22A. A heat exchanger 22P (schematically illustrated in FIG. 1) is provided inside the ducts 22D. For example, the heat exchanger 22P (see FIG. 1) includes a Peltier device, this being a plate shaped semiconductor element that exploits the Peltier effect. The temperature of the air in the ducts 22D can be changed by varying the applied voltage and direction of current supply to the Peltier device.

The air-conditioning unit 22 is fixed to a metal attachment bracket 34 disposed at the upper side of the air-conditioning unit 22 by bolts. The attachment bracket 34 is fixed to a metal cushion pan 32 disposed at the upper side of the metal attachment bracket 34 by wielding. The metal cushion pan 32 is provided at a front portion of the seat cushion frame, and supports a front portion 30A of the cushion pad 30 from the lower side.

The metal cushion pan 32 is formed with a pair of left and right through holes 32H at locations corresponding to the air outlet openings 22A. Respective ducts 24 are passed through the pair of left and right through holes 32H from the upper side, and lower end portions of the ducts 24 are connected to the air outlet openings 22A. The ducts 24 are fixed to the cushion pan 32 by bolts. The ducts 24 are curved to form substantially circular arc shapes with radial direction outsides of the circular arc shapes on a seat rear oblique upper side in side view of the seat. Upper openings 24A of the ducts 24 are disposed facing toward the seat front upper side.

Upper portions of the respective ducts 24 are disposed within recesses (not illustrated in the drawings) formed in a lower face side of the front portion 30A of the cushion pad 30. The front portion 30A of the cushion pad 30 is formed with through holes 30H at positions corresponding to the upper openings 24A of the ducts 24. The upper openings 24A of the ducts 24 are disposed in communication with the through holes 30H of the cushion pad 30. Although not illustrated in the drawings, through holes are also formed in the outer cover (not illustrated in the drawings) covering the cushion pad 30 at positions corresponding to the through holes 30H. Note that as a modified example, a configuration may be adopted in which the outer cover (not illustrated in the drawings) covering the cushion pad 30 is formed from a material that is permeable to air, and the outer cover is not formed with through holes.

In the above configuration, warm air or cool air from the air outlet openings 22A of the air-conditioning unit 22 is blown toward at least the seat front upper side through the ducts 24 and the through holes 30H. Note that the air blower mechanism 20 is configured including the air-conditioning unit 22 and the ducts 24.

The air blower mechanism 20 illustrated in FIG. 1 is capable of switching between a first state and a second state. In the first state, the air blower mechanism 20 operates so as to warm the seated occupant P from a front end portion 12A of the seat cushion 12. In the second state, the air blower mechanism 20 does not operate so as to warm the seated occupant P from the front end portion 12A of the seat cushion 12. More specifically, in the first state the air blower mechanism 20 supplies warm air toward at least the seat front upper side from the front end portion 12A of the seat cushion 12, and in the second state, the air blower mechanism 20 supplies cool air toward at least the seat front upper side from the front end portion 12A of the seat cushion 12.

Note that in 1, an example of the air supply range of the warm air or the cool air supplied by the air blower mechanism 20 is indicated by double-dotted dashed lines.

A motor 22M (illustrated schematically in the drawings) that drives the blower fan 22F of the air blower mechanism 20 and the heat exchanger 22P of the air blower mechanism 20 are electrically connected to an ECU 40 (illustrated in block form in the drawings). The ECU 40 includes a CPU, ROM, RAM, storage, and a communication interface, and these configuration sections are connected together through a bus so as to be capable of communicating with each other. Functional configuration of the ECU 40 further includes a control section 42 (illustrated in block form in the drawings). Functional configuration of the control section 42 is implemented by the CPU reading and executing a program stored in the ROM or the storage. In a state in which an occupant is sitting on the seat cushion 12, the control section 42 controls the air blower mechanism 20 (more specifically, the heat exchanger 22P and the motor 22M) so as to alternate the repeatedly between the first state in which the air blower mechanism 20 supplies warm air and the second state in which the air blower mechanism 20 supplies cool air.

Figure 3:
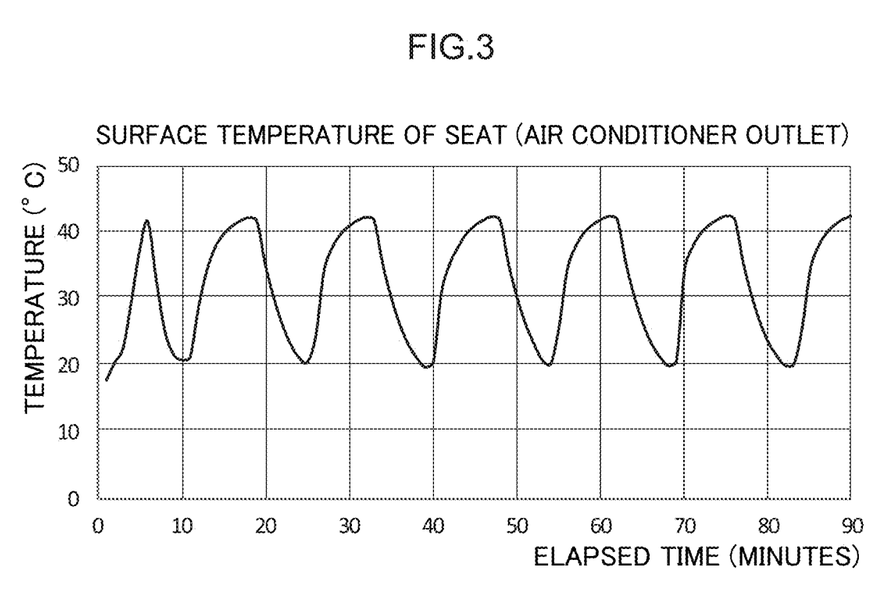
FIG. 3 is a graph illustrating a relationship between elapsed time from the start of operation of the air blower mechanism in FIG. 1 and surface temperature of a front end portion of the seat.

In the present exemplary embodiment, as an example, the temperature of the warm air is around 42° C., and the temperature of the cool air is around 20° C. The air blower mechanism 20 is controlled so as to supply warm air for five minutes following the start of operation, and subsequently supply cool air for 5 minutes at a time and supply warm air for 10 minutes at a time. Note that FIG. 3 is a graph illustrating a relationship between elapsed time from the start of operation of the air blower mechanism 20, and surface temperature of the front end portion 12A of the seat cushion 12 (air conditioner outlet).

As illustrated in FIG. 1, an operation switch 44 (illustrated in block form in the drawings) is electrically connected to the ECU 40. The operation switch 44 is a manual switch used to start and end control of operation of the air blower mechanism 20. The operation switch 44 is, for example, provided in a non-illustrated armrest so as to be turned on when an occupant sits down on the vehicle seat 10 and turned off when the occupant leaves the vehicle seat 10.

The seat cushion 12 is provided with a physical build detection sensor 38 (illustrated in block form in the drawings), serving as a physical build information acquisition section. The physical build detection sensor 38 acquires information relating to the physical build of the occupant by detecting the physical build of the occupant sitting on the seat cushion 12. As an example, the physical build detection sensor 38 is configured including a surface pressure sensor (seat sensor); however, the physical build detection sensor 38 may also be configured by another sensor, for example a load sensor (load cell). The physical build detection sensor 38 is electrically connected to the ECU 40 and outputs a signal corresponding to the physical build to the ECU 40.

The control section 42 also controls the air blower mechanism 20 (more specifically the motor 22M) based on the information acquired by the physical build detection sensor 38 so as to increase the rate at which air is supplied by the air blower mechanism 20 (in other words, so as to increase the revolution speed of the blower fan 22F) the larger the physical build of the seated occupant P.

Operation and Advantageous Effects

Next, explanation follows regarding operation and advantageous effects of the present exemplary embodiment.

In the present exemplary embodiment, the seat cushion 12 supports the buttocks and thighs of the seated occupant P. The air blower mechanism 20 provided in the seat cushion 12 is capable of switching between the first state in which the air blower mechanism 20 operates so as to warm the seated occupant P from the front end portion 12A of the seat cushion 12, and the second state in which the air blower mechanism 20 does not operate so as to warm the seated occupant P from the front end portion 12A of the seat cushion 12.

Note that when the operation switch 44 is switched on by the occupant (seated occupant P) sitting on the vehicle seat 10, the control section 42 controls the air blower mechanism 20 so as to alternate repeatedly between the first state and the second state. Accordingly, at least a region corresponding to the back of the knees Px of the seated occupant P and the vicinity thereof, namely a region comparatively distant from the heart and close to veins (in other words a region where veins are close to the skin) is warmed intermittently, thus effectively improving the blood circulation of the seated occupant P. Note that when the operation switch 44 is switched off when the seated occupant P leaves the vehicle seat 10, the control of operation of the air blower mechanism 20 by the control section 42 is ended.

In the present exemplary embodiment, in the first state the air blower mechanism 20 supplies warm air from the front end portion 12A of the seat cushion 12 toward at least the seat front upper side, and in the second state the air blower mechanism 20 supplies cool air from the front end portion 12A of the seat cushion 12 toward at least the seat front upper side. At least a region corresponding to the back of the knees Px of the seated occupant P and the vicinity thereof is thus warmed and cooled, thus even more effectively improving the blood circulation of the seated occupant P.

Figure 4:
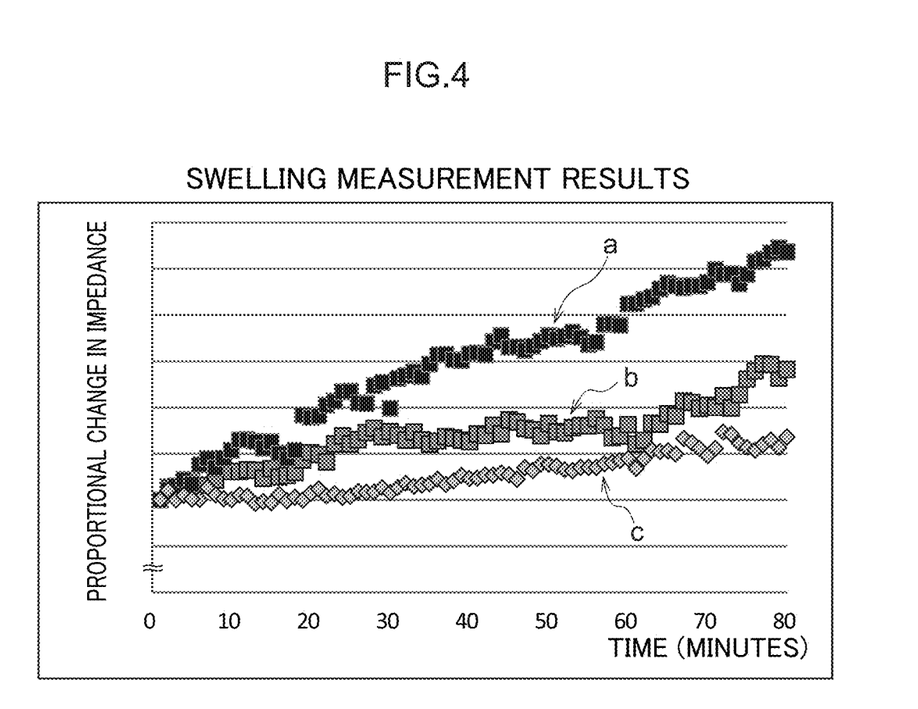
FIG. 4 is a graph illustrating test results for relationships between occupant sitting duration and proportional change in impedance in the first exemplary embodiment and in comparative examples.

FIG. 4 is a graph illustrating test results regarding relationships between occupant sitting duration and proportional change in impedance for the present exemplary embodiment and comparative examples. In this test, as an example, the impedance was measured by affixing electrodes to upper faces (front faces) of both legs of the seated occupant slightly to the thigh side of the knees, and supplying a very small current in this state. In the graph in FIG. 4, the letter a indicates the measurement results when the occupant is sitting on a vehicle seat (standard seat) not provided with the air blower mechanism 20, the letter b indicates the measurement results when the occupant is sitting on a vehicle seat provided with the air blower mechanism 20 and warm air is continuously supplied from the air blower mechanism 20, and the letter c indicates the measurement results when the occupant is sitting on the vehicle seat 10 of the present exemplary embodiment and the air blower mechanism 20 is controlled in a similar manner to that described in the present exemplary embodiment.

In the graph in FIG. 4, a higher proportional change in impedance represents a greater degree of swelling. Note that since it is widely known that proportional change in impedance can be used as an index for the degree of swelling, detailed explanation thereof is omitted. It can be seen from FIG. 4 that the present exemplary embodiment (see letter c) was the most effective at suppressing swelling.

Although not illustrated in the drawings, the degree of fatigue was tested by sensor evaluation at the 80 minute point in FIG. 4. In this test, a higher evaluation score was allocated the greater the degree of fatigue experienced. In the case of the occupant sitting on the vehicle seat not provided with the air blower mechanism 20, the evaluation result was 6.5, in the case of the occupant sitting on the vehicle seat provided with the air blower mechanism 20 with the warm air being continuously supplied from the air blower mechanism 20, the evaluation result was 4.8, and in the case of the occupant sitting on the vehicle seat 10 of the present exemplary embodiment with the air blower mechanism 20 being controlled in a similar manner to that described in the present exemplary embodiment, the evaluation result was 4.6. It can therefore be seen from this sensory evaluation testing that the present exemplary embodiment was the most effective at suppressing fatigue.

Figure 5:
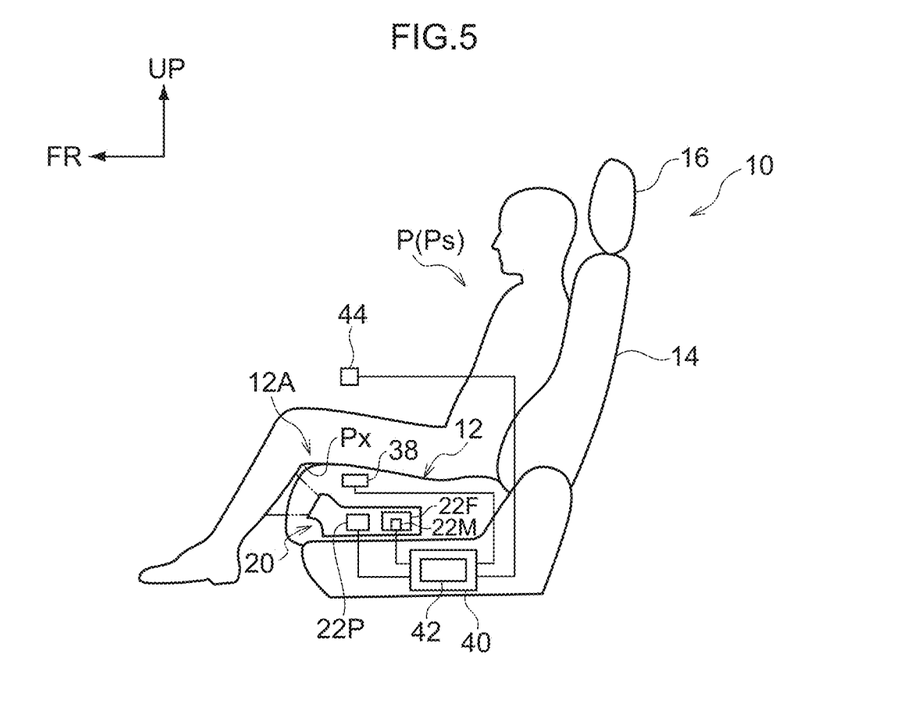
FIG. 5 is a schematic side view illustrating a state in which an occupant of small physical build is sitting on the vehicle seat in FIG. 1.

Moreover, in the present exemplary embodiment, the physical build detection sensor 38 illustrated in FIG. 1 acquires the information relating to the physical build of the occupant sitting on the seat cushion 12. The control section 42 controls the air blower mechanism 20 based on the information acquired by the physical build detection sensor 38 so as to increase the rate at which air is supplied by the air blower mechanism 20 the larger the physical build of the seated occupant P. Accordingly, the rate at which air is supplied by the air blower mechanism 20 is greater in a case in which an occupant P (Pb) with a large physical build, illustrated in FIG. 1, is sitting on the vehicle seat 10 than in a case in which an occupant P (Ps) with a small physical build, illustrated in FIG. 5, is sitting on the vehicle seat 10.

Accordingly, as illustrated in FIG. 1, at least a region corresponding to the back of the knees Px of the seated occupant P and the vicinity to the lower side thereof can be effectively warmed and cooled even in a case in which the seated occupant P has a large physical build and there is therefore a greater distance from the front end portion 12A of the seat cushion 12 to the back of the knees Px of the seated occupant P and the vicinity to the lower side thereof.

As described above, the vehicle seat 10 of the present exemplary embodiment enables swelling of the legs of the seated occupant P to be suppressed.

Second Exemplary Embodiment

Figure 6:
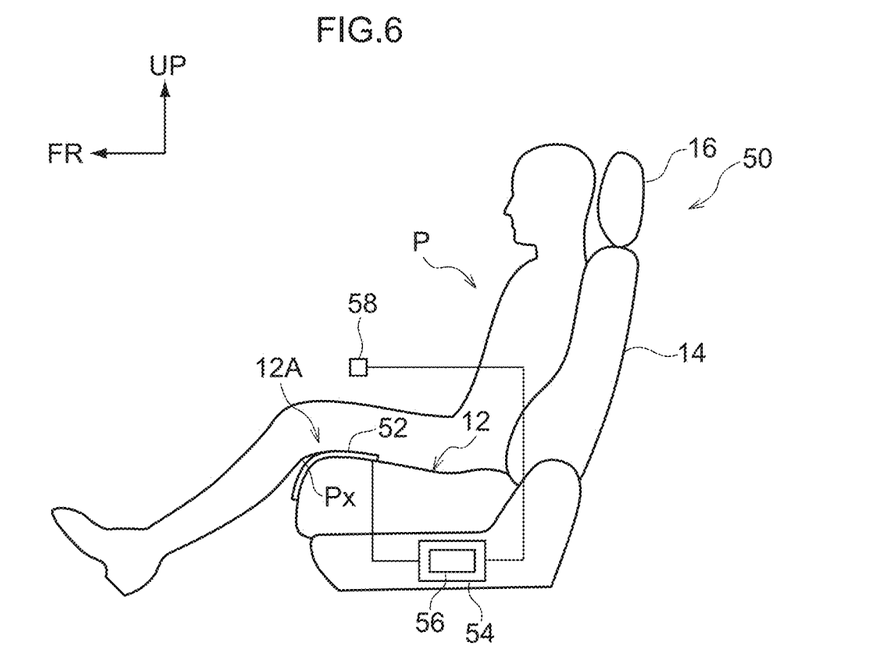
FIG. 6 is a schematic side view illustrating a vehicle seat according to a second exemplary embodiment of the present disclosure.
Figure 7:
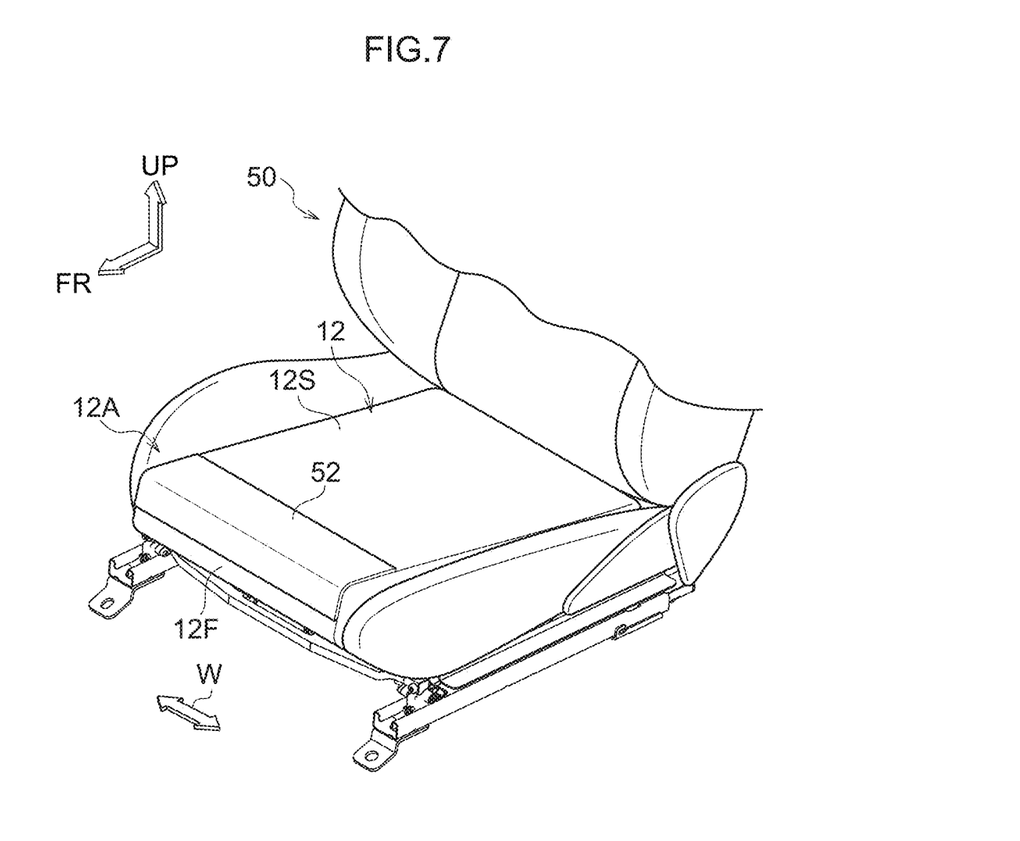
FIG. 7 is a perspective view illustrating a lower section of the vehicle seat in FIG. 6.

Next, explanation follows regarding a vehicle seat 50 according to a second exemplary embodiment of the present disclosure, with reference to FIG. 6 to FIG. 9. FIG. 6 is a schematic side view illustrating the vehicle seat 50 according to the present exemplary embodiment. FIG. 7 is a perspective view illustrating a lower section of the vehicle seat 50. As illustrated in FIG. 6 and FIG. 7, the vehicle seat 50 differs from the vehicle seat 10 according to the first exemplary embodiment (see FIG. 1) in the respect that a planar heater 52 is provided as a temperature changing section instead of the air blower mechanism 20 (see FIG. 1). Configurations other than those described below are effectively equivalent to those of the first exemplary embodiment. Those configuration sections that are effectively equivalent to those of the first exemplary embodiment are accordingly allocated the same reference numerals, and explanation thereof is omitted.

As illustrated in FIG. 6 and FIG. 7, the planar heater 52 is attached to the front end portion 12A of the seat cushion 12. Note that the planar heater 52 is a member also understood as a heating mat. As illustrated in FIG. 7, the planar heater 52 is disposed spanning from a front end side portion of a seat face 12S of the seat cushion 12 to an upper portion of a front end face 12F of the seat cushion 12, and is provided spanning from one to another seat width direction end side of the seat cushion 12. The planar heater 52 is configured including a plate shaped substrate and a heating coil, and is configured to generate heat when the heating coil is supplied with current.

The planar heater 52 is capable of switching between a first state and a second state. In the first state, the planar heater 52 operates so as to warm the seated occupant P (see FIG. 6) from the front end portion 12A of the seat cushion 12, and in the second state the planar heater 52 does not operate so as to warm the seated occupant P (see FIG. 6) from the front end portion 12A of the seat cushion 12. Namely, the planar heater 52 adopts the first state in Which the planar heater 52 is powered to generate heat, and the second state in which the planar heater 52 is in an unpowered state. As illustrated in FIG. 6, the planar heater 52 is electrically connected to an ECU 54 (illustrated in block form in the drawings).

Similarly to the ECU 40 (see FIG. 1) of the first exemplary embodiment, the ECU 54 includes a CPU, ROM, RAM, storage, and a communication interface, and these configuration sections are connected together through a bus so as to be capable of communicating with each other. Functional configuration of the ECU 54 further includes a control section 56 (illustrated in block form in the drawings). Functional configuration of the control section 56 is implemented by the CPU reading and executing a program stored in the ROM or the storage. In a state in which an occupant is sitting on the seat cushion 12, the control section 56 controls the planar heater 52 so as to alternate the planar heater 52 repeatedly between the first state in which the planar heater 52 is powered (an ON state) and the second state in which the planar heater 52 is not powered (an OFF state).

In the present exemplary embodiment, as an example, the temperature of the planar heater 52 when in the powered state is 39° C. The planar heater 52 is controlled so as to be placed in the powered state for the first 10 minutes, and subsequently controlled so as to alternate repeatedly between the unpowered state for 5 minutes at a time and the powered state for 10 minutes at a time. As an example, the temperature of the planar heater 52 when in the unpowered state is from 34° C. to 35° C.

Figure 8:
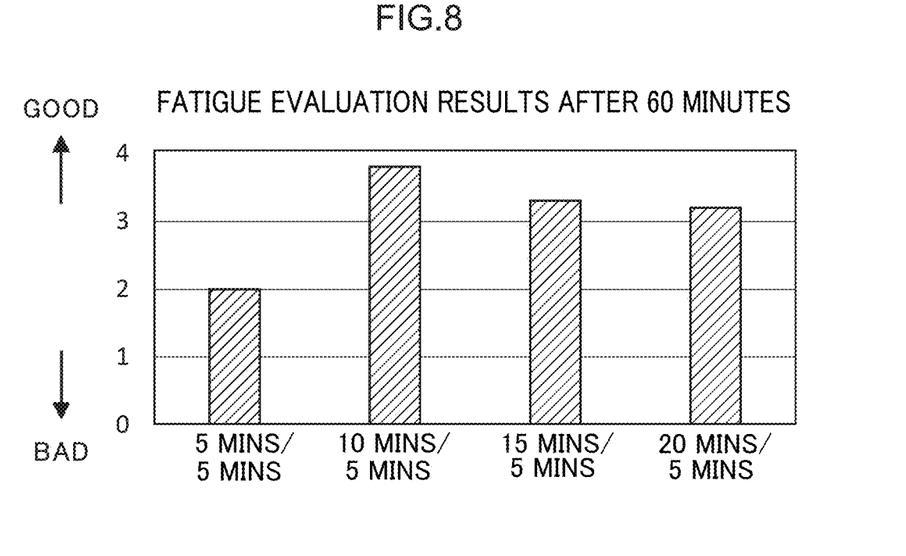
FIG. 8 is a graph illustrating fatigue evaluation results after 60 minutes of respective ON/OFF timing patterns of a planar heater illustrated in FIG. 6.

Explanation follows regarding the reasoning behind adopting the powered state for 10 minutes and the unpowered state for 5 minutes as in the present exemplary embodiment. FIG. 8 is a histogram illustrating the results of testing to decide the respective continuation durations for the powered state and the unpowered state. More specifically, FIG. 8 illustrates the results of fatigue evaluation 60 minutes after starting respective switch timing patterns of the powered state (ON state) and the unpowered state (OFF state) of the planar heater 52.

This testing was performed for four different patterns, namely a first pattern in which the powered state was maintained for 5 minutes and the unpowered state was maintained for 5 minutes, a second pattern in which in which the powered state was maintained for 10 minutes and the unpowered state was maintained for 5 minutes, a third pattern in which the powered state was maintained for 15 minutes and the unpowered state was maintained for 5 minutes, and a fourth pattern in which the powered state was maintained for 20 minutes and the unpowered state was maintained for 5 minutes. Each of these patterns begins with the powered state.

On the horizontal axis in the graph of FIG. 8, "5 MINS/5 MINS" corresponds to the first pattern, "10 MINS/5 MINS" corresponds to the second pattern, "15 MINS/5 MINS" corresponds to the third pattern, and "20 MINS/5 MINS" corresponds to the fourth pattern. The levels on the vertical axis of FIG. 8 represent sensory evaluation levels for fatigue. The higher the number, the lower the reported level of fatigue.

As illustrated in FIG. 8, it can be seen from this testing that the second pattern, in which the powered state was maintained for 10 minutes and the unpowered stale was maintained for 5 minutes, was the most effective out of the four patterns at suppressing fatigue. Accordingly, in the present exemplary embodiment the powered state is maintained for 10 minutes and the unpowered state is maintained for 5 minutes.

As illustrated in FIG. 6, an operation switch 58 (illustrated in block form in the drawings) is electrically connected to the ECU 54. The operation switch 58 is a manual switch used to start and end control of operation of the planar heater 52. The operation switch 58 is, for example, provided in a non-illustrated armrest so as to be turned on when an occupant sits down on the vehicle seat 50 and turned off when the occupant leaves the vehicle seat 50.

Operation and Advantageous Effects

Next, explanation follows regarding operation and advantageous effects of the present exemplary embodiment.

In the present exemplary embodiment, the planar heater 52 provided to the seat cushion 12 is capable of switching between the first state in which the planar heater 52 is operated so as to warm the seated occupant P from the front end portion 12A of the seat cushion 12, and the second state in which the planar heater 52 does not operate so as to warm the seated occupant P from the front end portion 12A of the seat cushion 12. Note that when the operation switch 58 is switched ON by an occupant (seated occupant P) sitting on the vehicle seat 50, the control section 56 controls the planar heater 52 so as to alternate repeatedly between the first state and the second state. Accordingly, at least a region corresponding to the back of the knees Px of the seated occupant P and the vicinity thereof, namely a region comparatively distant from the heart and close to veins (in other words a region where veins are close to the skin) is warmed intermittently, thus effectively improving the blood circulation of the seated occupant P. Note that when the operation switch 58 is switched off when the seated occupant P leaves the vehicle seat 50, control of operation of the planar heater 52 by the control section 56 is ended.

The planar heater 52 is disposed at the front end portion 12A of the seat cushion 12, and in the first state the planar heater 52 is powered to generate heat, and in the second state the planar heater 52 in the unpowered state. The blood circulation of the seated occupant P is thus effectively improved with a simple configuration and with low power consumption (and therefore also at low cost).

Figure 9:
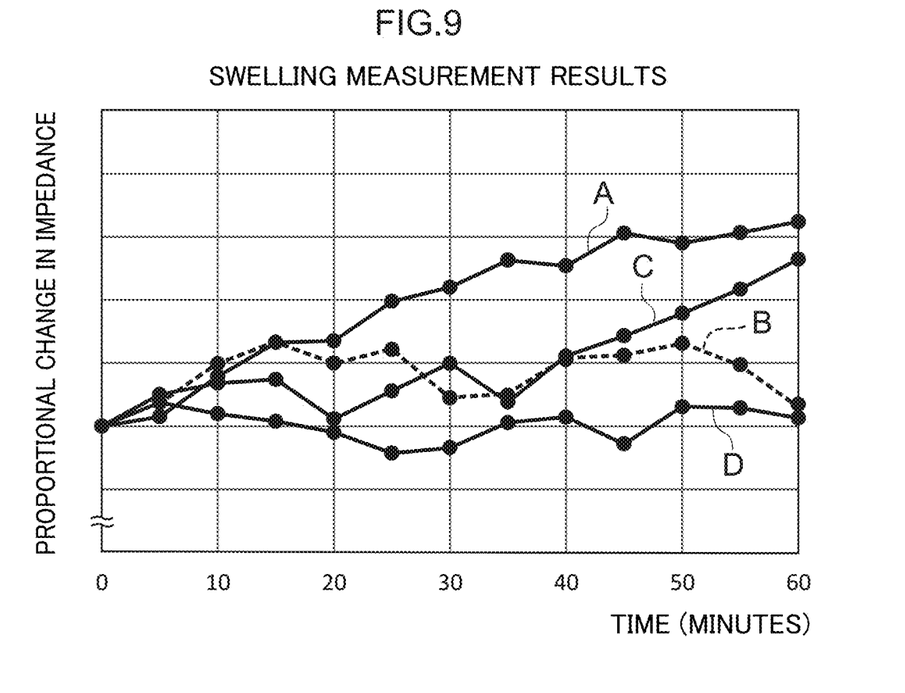
FIG. 9 is a graph illustrating test results for relationships between occupant sitting duration and proportional change in impedance in the second exemplary embodiment and in comparative examples.

FIG. 9 is a graph illustrating test results regarding relationships between occupant sitting duration and proportional change in impedance for the present exemplary embodiment and comparative examples. In this test, as an example, impedance was measured by affixing electrodes to an upper faces (front faces) of both legs of the seated occupant slightly to the thigh side of the knees, and supplying a very small current in this state.

In the graph in FIG. 9, the polygonal curve A represents measurement results when the occupant is sitting on a vehicle seat in which the planar heater 52 remains in the unpowered state throughout, and the polygonal curve B represents measurement results when the occupant is sitting on a vehicle seat in which the planar heater 52 remains in the powered state throughout. The polygonal curve C represents measurement results when the occupant is sitting on a vehicle seat in which the planar heater 52 in the seat cushion is replaced with a planar heater with a front end positioned corresponding to the position of the rear end of the planar heater 52, and extending to the vicinity of the lower side of a rear portion of the buttocks of the seated occupant, and this planar heater remains in the powered state throughout. The polygonal curve D represents measurement results when the occupant is sitting on the vehicle seat 50 of the present exemplary embodiment that alternates repeatedly between the first state and the second state.

In the graph in FIG. 9, a higher proportional change in impedance represents a greater degree of swelling. As can be seen from FIG. 9, the present exemplary embodiment (see the polygonal curve D) was the most effective in suppressing swelling.

As described above, the vehicle seat 50 of the present exemplary embodiment illustrated in FIG. 6 is capable of suppressing swelling of the legs of the seated occupant P.

SUPPLEMENTARY EXPLANATION OF THE EXEMPLARY EMBODIMENTS

In the first exemplary embodiment described above, the air blower mechanism 20 illustrated in FIG. 1 supplies cool air to at least the seat front upper side through the front end portion 12A of the seat cushion 12 when in the second state. Although this configuration is preferable, as a modified example of the first exemplary embodiment, a configuration may be adopted in which an air blower mechanism stops supplying air through the front end portion of a seat cushion (12) when in the second state.

In the first exemplary embodiment described above, the vehicle seat 10 is provided with the physical build detection sensor 38, and the control section 42 controls the air blower mechanism 20 based on the information acquired by the physical build detection sensor 38. Although this configuration is preferable, the vehicle seat does not need to be provided with this configuration.

As a modified example of the first exemplary embodiment, a physical build information acquisition section may, for example, be configured to enable data input of information relating to physical build, such that an occupant sitting on a seat cushion (12) performs data input of information relating to their own physical build in order for the physical build information acquisition section to acquire the information relating to the physical build of the occupant sitting on the seat cushion (12).

As another modified example of the first exemplary embodiment, a temperature detection section may be provided to detect the temperature of at least one out of the vehicle cabin interior or vehicle cabin exterior, and a control section (42) may control an air blower mechanism (20) based on the temperature detected by the temperature detection section in order to regulate the rate at which air is supplied by the air blower mechanism (20).

As another modified example of the first exemplary embodiment, a sitting sensor electrically connected to the ECU 40 may be provided instead of the operation switch 44, and a control section (42) may start controlling operation of the air blower mechanism 20 when a signal indicating that an occupant has sat down is input to the ECU 40 from the sitting sensor. When a signal indicating that the occupant is no longer in a seated state is input to the ECU 40 from the sitting sensor, the control section (42) stops controlling operation of the air blower mechanism 20. Note that a sensor applied as the physical build detection sensor 38 may double as such a sitting sensor.

Similarly, as a modified example of the second exemplary embodiment, a sitting sensor electrically connected to the ECU 54 may be provided instead of the operation switch 58 illustrated in FIG. 6, and a control section (56) may start controlling operation of the planar heater 52 when a signal indicating that an occupant has sat down is input to the ECU 54 from the sitting sensor. When a signal indicating that the occupant is no longer in a seated state is input to the ECU 54 from the sitting sensor, the control section (56) stops controlling operation of the planar heater 52.

Note that the exemplary embodiments and modified examples described above may be implemented in appropriate combinations.

Although explanation has been given regarding an example of the present disclosure, the present disclosure is not limited by the above explanation, and obviously various modifications may be implemented within a range not departing from the spirit of the present disclosure.

What is claimed is:

1. A vehicle seat comprising:
    a seat cushion configured to support buttocks and thighs of a seated occupant;
    a temperature changing section that is provided at the seat cushion and is switchable between a first state in which the temperature changing section operates so as to warm the seated occupant from a front end portion of the seat cushion, and a second state in which the temperature changing section does not operate so as to warm the seated occupant from the front end portion of the seat cushion, the temperature changing section including an air blower mechanism configured to supply warm air toward at least a seat front upper side through a front surface of the front end portion of the seat cushion when in the first state, and configured to supply cool air toward at least the seat front upper side through the front surface of the front end portion of the seat cushion when in the second state, the front surface facing toward a front side of the vehicle; and
    a control section configured to control the temperature changing section so as to alternate repeatedly between the first state and the second state while an occupant is sitting on the seat cushion.

2. The vehicle seat of claim 1, wherein the seat cushion includes a cushion pad, the cushion pad defining a through hole at the front surface of the seat cushion via which the air blower mechanism is configured to supply warm air toward at least the seat front upper side when in the first state, and configured to supply cool air toward at least the seat front upper side when in the second state.

3. The vehicle seat of claim 1, further comprising:
    a physical build information acquisition section configured to acquire information relating to a physical build of an occupant sitting on the seat cushion,
    wherein the control section is configured to control the air blower mechanism based on the information acquired by the physical build information acquisition section, such that a rate at which air is supplied by the air blower mechanism is directly proportional to a size of the physical build of the occupant.

4. The vehicle seat of claim 3, wherein the physical build information acquisition section includes a physical build detection sensor provided at the seat cushion, the physical build detection sensor being configured to acquire information relating to the physical build of the occupant by detecting the physical build of the occupant sitting on the seat cushion.

5. The vehicle seat of claim 3, wherein the information relating to the physical build of the occupant is information relating to a load of the occupant.

6. A vehicle seat comprising:
    a seat cushion configured to support buttocks and thighs of a seated occupant;
    a temperature changing section that is provided at the seat cushion and is switchable between a first state in which the temperature changing section operates so as to warm the seated occupant from a front end portion of the seat cushion, and a second state in which the temperature changing section does not operate so as to warm the seated occupant from the front end portion of the seat cushion, the temperature changing section including a planar heater disposed in the front end portion of the seat cushion, the planar heater being powered to generate heat when in the first state, the planar heater being placed in an unpowered state when in the second state, the planar heater spanning from a front end side portion of a seat face of the seat cushion to an upper portion of a front end face of the seat cushion and spanning from one seat width direction end side of the seat cushion to another seat width direction end side of the seat cushion; and
    a control section configured to control the temperature changing section so as to alternate repeatedly between the first state and the second state while an occupant is sitting on the seat cushion.

7. The vehicle seat of claim 6, wherein the planar heater spans continuously from the front end side portion of the seat face of the seat cushion to the upper portion of the front end face of the seat cushion.

8. A vehicle seat comprising:
    a seat cushion configured to support buttocks and thighs of a seated occupant;
    a temperature changing section that is provided at the seat cushion and is switchable between a first state in which the temperature changing section operates so as to warm the seated occupant from a front end portion of the seat cushion, and a second state in which the temperature changing section does not operate so as to warm the seated occupant from the front end portion of the seat cushion; and
    a control section configured to automatically control the temperature changing section so as to alternate repeatedly between operating in the first state for a first time period and in the second state for a second time period while an occupant is sitting on the seat cushion.

* * * * *